(12) United States Patent
Lin et al.

(10) Patent No.: US 12,549,027 B2
(45) Date of Patent: Feb. 10, 2026

(54) POWER SUPPLY CIRCUIT AND METHOD, AND VEHICLE EMPLOYING CIRCUIT

(71) Applicants: Futaijing Precision Electronics (Yantai) Co., Ltd., Yantai (CN); HON HAI PRECISION INDUSTRY CO., LTD., New Taipei (TW)

(72) Inventors: Kuan-Hao Lin, New Taipei (TW); Tzu-Yang Wu, Tu-Cheng (TW); Hsin-Hung Liu, Tu-Cheng (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 110 days.

(21) Appl. No.: 18/540,066

(22) Filed: Dec. 14, 2023

(65) Prior Publication Data

US 2025/0132584 A1    Apr. 24, 2025

(30) Foreign Application Priority Data

Oct. 20, 2023    (CN) .......................... 202311370639.4

(51) Int. Cl.
*H02J 7/00*    (2006.01)
*B60L 58/10*    (2019.01)

(52) U.S. Cl.
CPC ............ *H02J 7/0063* (2013.01); *B60L 58/10* (2019.02); *H02J 7/0047* (2013.01); *H02J 2310/48* (2020.01)

(58) Field of Classification Search
CPC .... H02J 7/0063; H02J 7/0047; H02J 2310/48; B60L 58/10
See application file for complete search history.

(56) References Cited

U.S. PATENT DOCUMENTS

| 9,573,540 | B2 | 2/2017 | Kanzaki et al. |
| 9,932,001 | B2 | 4/2018 | Ueta et al. |
| 2011/0074356 | A1* | 3/2011 | Yamazaki ........... H02M 3/1582 320/134 |
| 2013/0076125 | A1* | 3/2013 | Aragai ...................... H02J 1/14 307/9.1 |

(Continued)

FOREIGN PATENT DOCUMENTS

| CN | 207523615 | 6/2018 |
| EP | 3572889 | 11/2019 |

*Primary Examiner* — Rexford N Barnie
*Assistant Examiner* — Duc M Pham
(74) *Attorney, Agent, or Firm* — ScienBiziP, P.C.

(57) ABSTRACT

A power supply circuit for stably supplying power to loads of a vehicle comprises a battery pack, a switch circuit, a first control circuit, a detection circuit, and a second control circuit. The first control circuit is configured to output a first control signal to turn on the switch circuit and the battery pack can supply power to the loads when the vehicle is in a first state. The detection circuit is configured to detect whether the first control circuit normally outputs the first control signal during the first state and output a trigger signal to the second control circuit in response to the first control circuit does not output the first control signal. The second control circuit outputs a second control signal according to the trigger signal to control the switch circuit to be turned on. A power supply method and the vehicle are also disclosed.

16 Claims, 3 Drawing Sheets

(56) References Cited

U.S. PATENT DOCUMENTS

2020/0094758 A1   3/2020   Kawakami
2021/0066956 A1   3/2021   Izawa et al.
2023/0400520 A1*  12/2023  Li ......................... H02J 7/0024

* cited by examiner

POWER SUPPLY CIRCUIT AND METHOD, AND VEHICLE EMPLOYING CIRCUIT

TECHNICAL FIELD

The subject matter herein generally relates to power supply of loads of vehicles.

BACKGROUND

When a vehicle is power-on, multiple loads of the vehicle (such as dashboards and control panels) must be maintained in a stable power supply state, otherwise a driving safety of the vehicle may be affected. How to ensure the stable power supply of the loads of the vehicle is a problem to be solved.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to;" it specifically indicates open-ended inclusion or membership in the so-described combination, group, series, and the like.

Figure 1:
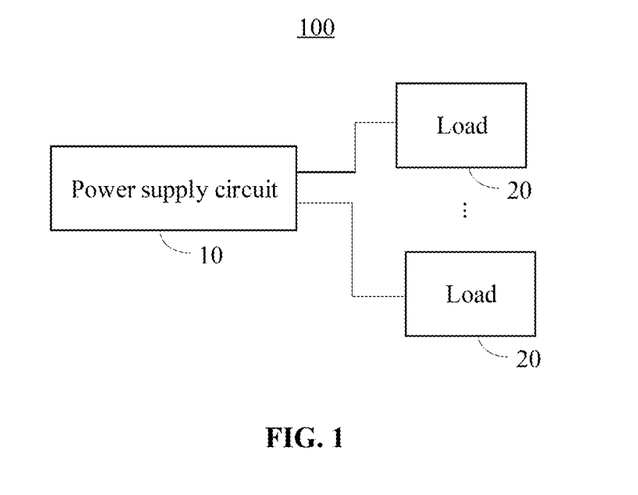
FIG. 1 is a block diagram illustrating a vehicle according to an embodiment of the present disclosure.

FIG. 1 illustrates one exemplary embodiment of a vehicle 100. The vehicle 100 includes a power supply circuit 10 and one or more loads 20. The power supply circuit 10 is configured to supply power to the one or more loads 20.

The embodiments does not limit the loads 20 of the vehicle 100. The vehicle 100 may be a two-wheeled vehicle, a three-wheeled vehicle, a four-wheeled vehicle, etc. The loads 20 may be low voltage equipment of the vehicle 100, for example, the loads 20 may include dashboards, center control screens, lamps, and so on.

Figure 2:
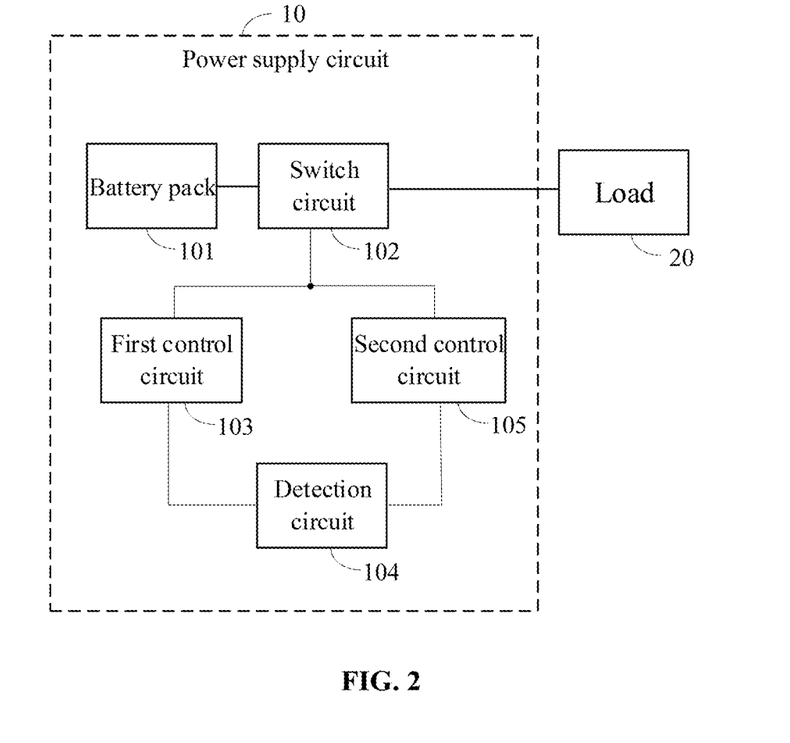
FIG. 2 is a block diagram illustrating a power supply circuit according to an embodiment of the present disclosure.

Referring to FIG. 2, the power supply circuit 10 may include a battery pack 101, a switch circuit 102, a first control circuit 103, a detection circuit 104, and a second control circuit 105. The battery pack 101 can include multiple batteries in series, or in parallel, or combined in series and parallel. Each of the multiple batteries can be a lithium battery, or a lead-acid battery, etc.

The switch circuit 102 includes an input terminal, an output terminal, and a control terminal. The input terminal of the switch circuit 102 is coupled to the battery pack 101, and the output terminal of the switch circuit 102 is coupled to the loads 20 of the vehicle 100.

In one embodiment, working voltages of the loads 20 may be 5V or 12V, and a voltage received by the input terminal of the switch circuit 102 may be 12V (direct current (DC) voltage), and if an output voltage of the battery pack 101 is higher than 12V, the output voltage of the battery pack 101 can be converted and outputted to the input terminal of the switch circuit 102 through a current DC-DC conversion circuit/module.

In one embodiment, a state of the vehicle 100 may include a first state and a second state. For example, the first state of the vehicle 100 may be a non-flameout (engine ignition state) state or a power-on state, the second state of the vehicle 100 may be a flameout state or a power-off state.

The first control circuit 103 is coupled to the control terminal of the switch circuit 102. The first control circuit 103 is configured to output a first control signal to the switch circuit 102 when the state of the vehicle 100 is the first state, the switch circuit 102 can be turned on based on the first control signal, and then the battery pack 101 can supply power to the loads 20 of the vehicle 100. For example, the vehicle 100 is in the power-on state, and the battery pack 101 can supply power to the loads 20 of the vehicle 100 to avoid power outages of the loads 20 affecting driving safety.

The second control circuit 105 is coupled to the control terminal of the switch circuit 102. The detection circuit 104 is coupled to the first control circuit 103 and the second control circuit 105. The detection circuit 104 is configured to detect whether the first control circuit 103 normally outputs the first control signal in response to the vehicle 100 being in the first state. If the vehicle 100 is in the first state and the first control circuit 103 does not normally output the first control signal, the detection circuit 104 outputs a trigger signal to the second control circuit 105. The second control circuit 105 outputs a second control signal based on the trigger signal to control the switch circuit 102 to be turned on. Then, the switch circuit 102 can maintain on during the first state, the loads 20 can be maintained in a stable power supply state even if the first control circuit 103 is abnormal.

In one embodiment, the first control circuit 103 normally outputting the first control signal is that the first control circuit 103 can continuously output the first control signal to turn on the switch circuit 102, otherwise, the first control circuit 103 does not normally output the first control signal, the loads 20 can be powered uninterruptibly.

The switch circuit 102 may include a triode, a metal-oxide-semiconductor field-effect transistor, or a relay, etc. The switch circuit 102 can be turned on based on the first control signal or the second control signal, and the battery pack 101 can supply power to the loads 20 via the switch circuit 102.

In one embodiment, the first control signal and the second control signal may be high level signals or low level signals, the trigger signal may be a high level signal or a low level signal.

In one embodiment, the first control circuit 103 is further configured to obtain the state of the vehicle 100. When the vehicle 100 is in the second state, the first control circuit 103 suspends to output the first control signal, and the detection circuit 104 suspends to detect whether the first control circuit 103 normally outputs the first control signal.

In one embodiment, the first control circuit 103 and the second control circuit 105 can be realized by a circuit module or a control chip with control function. For example, the vehicle 100 is a four-wheeled vehicle, the first control circuit 103 may include a first control chip, the first control chip may an integrated cockpit controller (ICC). The second control circuit 105 may include a second control chip, and the second control chip may be a microcontroller unit (MCU).

The power supply circuit 100 of the embodiments includes a dual control guarantee mechanism of the switch circuit 102 by setting the first control circuit 103 and the second control circuit 105, using the detecting circuit 104 to detect whether the first control circuit 103 normally outputs the control signal for turning on the switch circuit 102, and when the first control circuit 103 does not normally output the control signal, the second control circuit 105 is triggered to output the control signal, the stable power supply of the loads 20 of the vehicle 100 in the non-flameout state can be guaranteed, and the driving safety of vehicle 100 can be improved.

Figure 3:
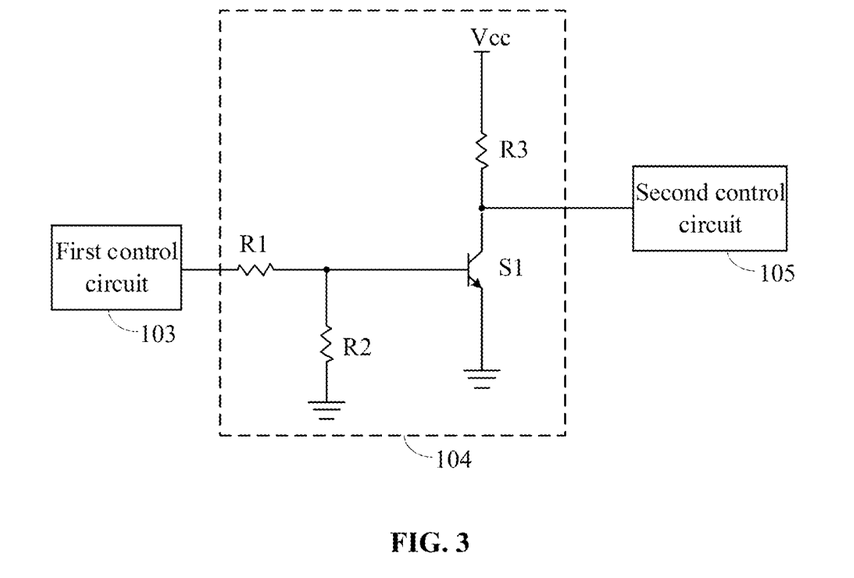
FIG. 3 is a circuit diagram illustrating a detection circuit of the power supply circuit in FIG. 2 according to an embodiment of the present disclosure.

Referring to FIG. 3, the detecting circuit 104 is coupled to the first control circuit 103 and the second control circuit 105. The detecting circuit 104 may include a first resistor R1, a second resistor R2, a first switch element S1, and a third resistor R3. A first terminal of the first resistor R1 is coupled to the first control circuit 103, the first terminal of the first resistor R1 is configured to receive the control signal outputted by the first control circuit 103. A first terminal of the second resistor R2 is coupled to a second terminal of the first resistor R1, and a second terminal of the second resistor R2 is grounded. The first switch element S1 includes a first terminal, a second terminal, and a control terminal. The first terminal of the first switch element S1 is coupled to the second control circuit 105, and the first terminal of the first switch element S1 is configured to output the trigger signal. The control terminal of the first switch element S1 is coupled to the second terminal of the first resistor R1, and the second terminal of the first switch element S1 is grounded. A first terminal of the third resistor R3 is configured to receive a first voltage Vcc, and a second terminal of the third resistor R3 is coupled to the first terminal of the first switch element S1.

In one embodiment, the circuit structure shown in FIG. 3 does not constitute a limitation of the circuit structure of the detection circuit 104, and the circuit structure of the detection circuit 104 can be adjusted according to an actual requirement. The circuit structure of the detection circuit 104 can be designed in accordance with a high-level signal or a low-level signal outputting to the second control circuit 105 with respect to the first control signal being normally outputted or not. For example, one or more resistors of the first resistors R1, the second resistor R2, and the third resistor R3 can be omitted. For example, the first resistor R1 can be omitted, or the second resistor R2 can be omitted.

In one embodiment, a value of the first voltage Vcc is 3.3V, the second control circuit 105 includes a MCU chip. The first voltage Vcc may also be a working voltage of the MCU chip, the first terminal of the third resistor R3 is coupled to a power supply pin of the MCU chip. The first switch element S1 may be a triode, or an oxide semiconductor field-effect transistor, etc. Taking the first control signal as a high-level signal as an example, the first switch element S1 may be a negative-positive-negative (NPN) transistor. When the first control circuit 103 normally outputs the first control signal, the control terminal (base electrode of the NPN transistor) of the first switch element S1 is high-level, the first switch element S1 is turned on, the first terminal (collector electrode of the NPN transistor) of the first switch element S1 is low-level, and the second control circuit 105 can receive a low-level signal. When the first control circuit 103 fails to output the first control signal, the control terminal of the first switch element S1 is low-level, the first switch element S1 is turned off, and the first terminal of the first switch element S1 is high-level, and the second control circuit 105 can receive a high-level signal (trigger signal). The second control circuit 105 can output a second control signal based on the high-level signal, to substitute the first control circuit 103 to turn on the switch circuit 102.

In one embodiment, the high-level signal can be a voltage signal greater than 1.8V or 2.4V, and the low-level signal can be a voltage signal less than 0.8V or 0.5V.

Figure 4:
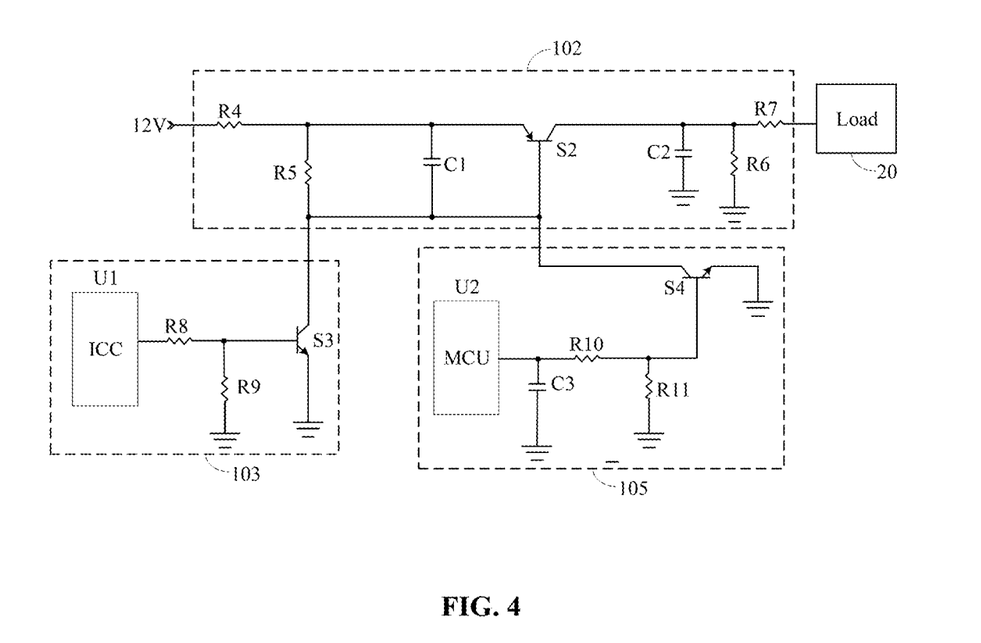
FIG. 4 is a circuit diagram illustrating a switch circuit, a first control circuit, and a second control circuit of the power supply circuit in FIG. 2 according to an embodiment of the present disclosure.

Referring to FIG. 4, the switch circuit 102 may include a fourth resistor R4, a second switch element S2, a fifth resistor R5, a sixth resistor R6, a seventh resistor R7, a first capacitor C1, and a second capacitor C2. A first terminal of the fourth resistor R4 is coupled to the battery pack 101, the first terminal of the fourth resistor R4 is configured to receive a voltage outputted by the battery pack 101. The working voltage of each of the loads 20 may be generally 5V or 12V, the voltage received by the switch circuit 102 is generally 12V, if the voltage outputted by the battery pack 101 is higher than 12V, the voltage of the battery pack 101 can also be output to the first terminal of the fourth resistor R4 after a DC-DC conversion. FIG. 4 shows that the voltage received by the first terminal of the fourth resistor R4 is a 12V DC as an example.

The second switch element S2 includes a first terminal, a second terminal, and a control terminal. The first terminal of the second switch element S2 is coupled to a second terminal of the fourth resistor R4, the control terminal of the second switch element S2 is coupled to the first control circuit 103 and the second control circuit 105. The fifth resistor R5 is coupled between the first terminal and the control terminal of the second switch element S2. The first capacitor C1 is coupled to the fifth resistor R5 in parallel. A first terminal of the second capacitor C2 is coupled to a second terminal of the second switch element S2, and a second terminal of the second capacitor C2 is grounded. A first terminal of the sixth resistor R6 is coupled to the second terminal of the second switch element S2, and a second terminal of the sixth resistor R6 is grounded; a seventh resistor. A first terminal of the seventh resistor R7 is coupled to the second terminal of the second switch element S2, and a second terminal of the seventh resistor R7 is coupled to the loads 20 of the vehicle 100.

In one embodiment, the circuit structure shown in FIG. 4 does not constitute a limitation of the circuit structure of the switch circuit 102, and the circuit structure of the switch circuit 102 can be adjusted according to an actual requirement. The circuit structure of the switch circuit 102 can be designed to turned on/off based on receiving or not receiving a control signal (first control signal or second control signal). For example, one or more resistors or capacitors of the switch circuit 102 can be omitted. For example, the fifth resistor R5 can be omitted, the seventh resistor R7 can be omitted, the second capacitor C2 can be omitted.

In one embodiment, if a conducting time of the second switching element S2 is too fast, and a Miller effect may be caused. The Miller effect can be inhibited by adjusting the resistance values of resistors (fourth resistor R4, fifth resistor R5, sixth resistor R6, and seventh resistor R7) and/or the capacitance values of capacitors (first capacitor C1 and second capacitor C2) of the switch circuit 102.

In one embodiment, the second switch element S2 may be a triode, or an oxide semiconductor field-effect transistor, etc. As shown in FIG. 4, the second switch element S2 may be a positive-negative-positive (PNP) transistor. The first terminal of the second switch element S2 is a emitter electrode, the second terminal of the second switch element S2 is a collector electrode, and the control terminal of the second switch element S2 is a base electrode.

In one embodiment, the first control circuit 103 includes a first control chip U1, an eighth resistor R8, a ninth resistor R9, and a third switch element S3. A first terminal of the eighth resistor R8 is coupled to the first control chip U1, the first terminal of the eighth resistor R8 is configured to receive the first control signal outputted by the first control chip U1. A first terminal of the ninth resistor R9 is coupled to a second terminal of the eighth resistor R8, and a second terminal of the ninth resistor R9 is grounded. The third switch element includes a first terminal, a second terminal, and a control terminal. The control terminal of the third switch element S3 is coupled to the second terminal of the eighth resistor R8, the first terminal of the third switch element S3 is coupled to the control terminal of the second switch element S2, and the second terminal of the third switch element S3 is grounded.

In one embodiment, the first control chip U1 can be a chip with control functions, including but not limited to a processor, a single-chip microcomputer, a MCU, a programmable logic circuit, etc.

In one embodiment, the third switch element S3 may be a triode, or an oxide semiconductor field-effect transistor, etc. As shown in FIG. 4, the third switch element S3 may be a NPN transistor. The first terminal of the third switch element S3 is a collector electrode, the second terminal of the third switch element S3 is a emitter electrode, and the control terminal of the third switch element S3 is a base electrode.

In one embodiment, the circuit structure shown in FIG. 4 does not constitute a limitation of the circuit structure of the first control circuit 103, and the circuit structure of the first control circuit 103 can be adjusted according to an actual requirement. For example, the eighth resistor R8 can be omitted, the ninth resistor R9 can be omitted.

In one embodiment, the second control circuit 105 may include a second control chip U2, a tenth resistor R10, an eleventh resistor R11, a third capacitor C3, and a fourth switch element S4. A first terminal of the tenth resistor R10 is coupled to the second control chip U2, the second control chip U2 is configured to output the second control signal based on the trigger signal. As shown in FIG. 4, the second control chip U2 may be a MCU as an example, the first terminal of the tenth resistor R10 is configured to receive the second control signal. A first terminal of the eleventh resistor R11 is coupled to a second terminal of the tenth resistor R10, and a second terminal of the eleventh resistor R11 is grounded. A first terminal of the third capacitor C3 is coupled to a second terminal of the tenth resistor R10, and a second terminal of the third capacitor C3 is grounded. The fourth switch element S4 include a first terminal, a second terminal, and a control terminal. The control terminal of the fourth switch element S4 is coupled to the second terminal of the tenth resistor R10, the first terminal of the fourth switch element S4 is coupled to the control terminal of the second switch element S2, and the second terminal of the fourth switch element S4 is grounded.

In one embodiment, the fourth switch element S4 may be a triode, or an oxide semiconductor field-effect transistor, etc. As shown in FIG. 4, the fourth switch element S4 may be a NPN transistor. The first terminal of the fourth switch element S4 is a collector electrode, the second terminal of the fourth switch element S4 is a emitter electrode, and the control terminal of the fourth switch element S4 is a base electrode.

In one embodiment, the circuit structure shown in FIG. 4 does not constitute a limitation of the circuit structure of the second control circuit 105, and the circuit structure of the second control circuit 105 can be adjusted according to an actual requirement. For example, the tenth resistor R10 can be omitted, the eleventh resistor R11 can be omitted, the third capacitor C3 can be omitted.

Components of the power supply circuit 10 of the embodiments are simple and have lower prices, and the quantity of the components is relatively small, the reliability of the power supply circuit 10 is high, a circuit board layout area of the power supply circuit 10 can be less than 0.6 square centimeter and the component layout area of the power supply circuit 10 is small, and it is convenient to be layout on the current power control circuit board of the vehicle 100.

Figure 5:
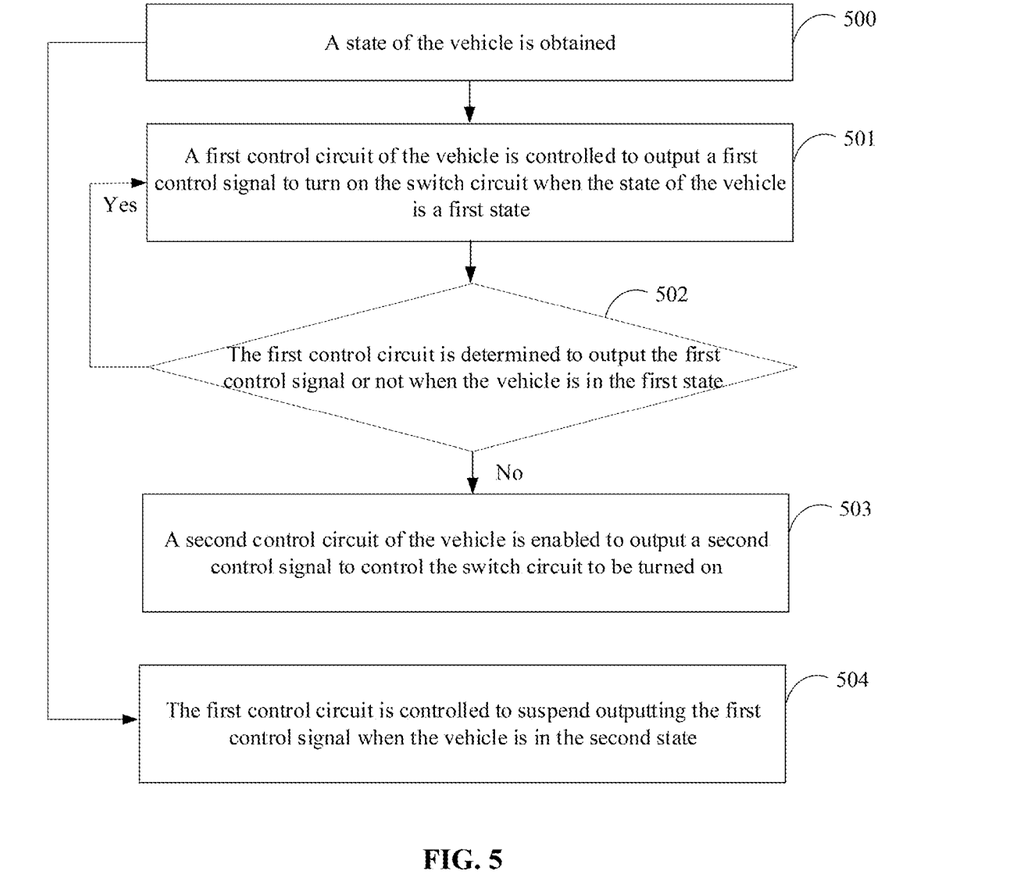
FIG. 5 is a flowchart illustrating a power supply method according to an embodiment of the present disclosure.

FIG. 5 illustrates one exemplary embodiment of an power supply method. The power supply method can be configured for controlling a battery pack to supply power to loads of a vehicle. A switch circuit is coupled between the battery pack and the loads of the vehicle. The flowchart presents an exemplary embodiment of the method. The exemplary method is provided by way of example, as there are a variety of ways to carry out the method. Each block shown in FIG. 5 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be begin at block 500.

In block 500, a state of the vehicle is obtained.

The state of the vehicle include a first state and a second state. The first state of the vehicle may be a non-flameout (engine ignition state) state or a power-on state, the second state of the vehicle may be a flameout state or a power-off state.

In block 501, a first control circuit of the vehicle is controlled to output a first control signal to turn on the switch circuit when the state of the vehicle is a first state.

When the switch circuit is turned on, the battery pack can supply power to the loads of the vehicle.

In block 502, the first control circuit is determined to output the first control signal or not when the vehicle is in the first state.

In block 503, a second control circuit of the vehicle is enabled to output a second control signal to control the switch circuit to be turned on when the first control circuit does not output the first control signal during the first state.

In one embodiment, if the first control circuit is determined to normally output the first control signal, block 501 can be continued to perform, the switch circuit 102 is continuously to be turned on by the first control signal, and the battery pack 101 can supply power to the load of the vehicle.

In block 504, the first control circuit is controlled to suspend outputting the first control signal when the vehicle is in the second state.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A power supply circuit for supplying power to loads of a vehicle, the power supply circuit comprising:
   a battery pack;
   a switch circuit comprising an input terminal, an output terminal, and a control terminal, the input terminal of the switch circuit coupled to the battery pack, and the output terminal of the switch circuit coupled to the loads of the vehicle;
   a first control circuit coupled to the control terminal of the switch circuit, wherein the first control circuit is configured to output a first control signal to turn on the switch circuit, and the battery pack supplies power to the loads of the vehicle in response to a state of the vehicle being a first state;
   a second control circuit coupled to the control terminal of the switch circuit; and
   a detection circuit coupled to the first control circuit and the second control circuit, wherein the detection circuit is configured to detect whether the first control circuit normally outputs the first control signal in response to the vehicle being in the first state, and the detection circuit outputs a trigger signal to the second control circuit in response to the first control circuit does not output the first control signal during the first state,
   wherein the second control circuit outputs a second control signal according to the trigger signal to control the switch circuit to be turned on;
   wherein the switch circuit comprises:
   a first resistor, a first terminal of the first resistor coupled to the battery pack;
   a first switch element, a first terminal of the first switch element coupled to a second terminal of the first resistor, a control terminal of the first switch element coupled to the first control circuit and the second control circuit;
   a second resistor coupled between the first terminal and the control terminal of the first switch element;
   a first capacitor coupled to the second resistor in parallel;
   a second capacitor, a first terminal of the second capacitor coupled to a second terminal of the first switch element, and a second terminal of the second capacitor being grounded;
   a third resistor, a first terminal of the third resistor coupled to the second terminal of the first switch element, and a second terminal of the third resistor being grounded; and
   a fourth resistor, a first terminal of the fourth resistor coupled to the second terminal of the first switch element, and a second terminal of the fourth resistor coupled to the loads of the vehicle.

2. The power supply circuit of claim 1, wherein the first control circuit is further configured to obtain the state of the vehicle, the first control circuit suspends to output the first control signal in response to the vehicle is in a second state, the first state of the vehicle is a non-flameout state or a power-on state, and the second state of the vehicle is a flameout state or a power-off state.

3. The power supply circuit of claim 1, wherein the detection circuit comprises:
   a fifth resistor, a first terminal of the fifth resistor coupled to the first control circuit;
   a sixth resistor, a first terminal of the sixth resistor coupled to a second terminal of the fifth resistor, and a second terminal of the sixth resistor being grounded;
   a second switch element, a first terminal of the second switch element coupled to the second control circuit, a control terminal of the second switch element coupled to the second terminal of the fifth resistor, and a second terminal of the second switch element being grounded; and
   a seventh resistor, a first terminal of the seventh resistor configured to receive a first voltage, and a second terminal of the seventh resistor coupled to the first terminal of the second switch element.

4. The power supply circuit of claim 1, wherein the second switch element comprises a triode, a metal-oxide-semiconductor field-effect transistor, or a relay.

5. The power supply circuit of claim 1, wherein the first control circuit comprises:
   a first control chip;
   an eighth resistor, a first terminal of the eighth resistor coupled to the first control chip;
   a ninth resistor, a first terminal of the ninth resistor coupled to a second terminal of the eighth resistor, and a second terminal of the ninth resistor being grounded; and
   a third switch element, a control terminal of the third switch element coupled to the second terminal of the eighth resistor, a first terminal of the third switch element coupled to the switch circuit, and a second terminal of the third switch element being grounded.

6. The power supply circuit of claim 5, wherein the second control circuit comprises:
   a second control chip;
   a tenth resistor, a first terminal of the tenth resistor coupled to the second control chip;
   an eleventh resistor, a first terminal of the eleventh resistor coupled to a second terminal of the tenth resistor, and a second terminal of the eleventh resistor being grounded;

a third capacitor, a first terminal of the third capacitor coupled to the second terminal of the tenth resistor, and a second terminal of the third capacitor being grounded; and a fourth switch element, a control terminal of the fourth switch element coupled to the second terminal of the tenth resistor, a first terminal of the fourth switch element coupled to the switch circuit, and a second terminal of the fourth switch element being grounded.

7. The power supply circuit of claim 6, wherein the loads of the vehicle comprise a dashboard and a center control panel, the first control chip comprises an integrated cockpit controller (ICC), and the second control chip comprises a microcontroller unit (MCU).

8. A vehicle comprising a power supply circuit, the power supply circuit configured to supply power to loads of the vehicle, the power supply circuit comprising:
    a battery pack;
    a switch circuit comprising an input terminal, an output terminal, and a control terminal, the input terminal of the switch circuit coupled to the battery pack, and the output terminal of the switch circuit coupled to the loads of the vehicle;
    a first control circuit coupled to the control terminal of the switch circuit, wherein the first control circuit is configured to output a first control signal to turn on the switch circuit and the battery pack supplies power to the loads of the vehicle in response to a state of the vehicle being a first state;
    a second control circuit coupled to the control terminal of the switch circuit; and
    a detection circuit coupled to the first control circuit and the second control circuit, wherein the detection circuit is configured to detect whether the first control circuit normally outputs the first control signal in response to the vehicle being in the first state, and the detection circuit outputs a trigger signal to the second control circuit in response to the first control circuit does not output the first control signal during the first state,
    wherein the second control circuit outputs a second control signal according the trigger signal to control the switch circuit to be turned on;
    wherein the switch circuit comprises:
    a first resistor, a first terminal of the first resistor coupled to the battery pack;
    a first switch element, a first terminal of the first switch element coupled to a second terminal of the first resistor, a control terminal of the first switch element coupled to the first control circuit and the second control circuit;
    a second resistor coupled between the first terminal and the control terminal of the first switch element;
    a first capacitor coupled to the second resistor in parallel;
    a second capacitor, a first terminal of the second capacitor coupled to a second terminal of the first switch element, and a second terminal of the second capacitor being grounded;
    a third resistor, a first terminal of the third resistor coupled to the second terminal of the first switch element, and a second terminal of the third resistor being grounded; and
    a fourth resistor, a first terminal of the fourth resistor coupled to the second terminal of the first switch element, and a second terminal of the fourth resistor coupled to the loads of the vehicle.

9. The vehicle of claim 8, wherein the first control circuit is further configured to obtain the state of the vehicle, the first control circuit suspends to output the first control signal in response to the vehicle is in a second state, the first state of the vehicle is a non-flameout state or a power-on state, and the second state of the vehicle is a flameout state or a power-off state.

10. The vehicle of claim 8, wherein the detection circuit comprises:
    a fifth resistor, a first terminal of the fifth resistor coupled to the first control circuit;
    a sixth resistor, a first terminal of the sixth resistor coupled to a second terminal of the fifth resistor, and a second terminal of the sixth resistor being grounded;
    a second switch element, a first terminal of the second switch element coupled to the second control circuit, a control terminal of the second switch element coupled to the second terminal of the fifth resistor, and a second terminal of the second switch element being grounded; and
    a seventh resistor, a first terminal of the seventh resistor configured to receive a first voltage, and a second terminal of the seventh resistor coupled to the first terminal of the second switch element.

11. The vehicle of claim 8, wherein the second switch element comprises a triode, a metal-oxide-semiconductor field-effect transistor, or a relay.

12. The vehicle of claim 8, wherein the first control circuit comprises:
    a first control chip;
    an eighth resistor, a first terminal of the eighth resistor coupled to the first control chip;
    a ninth resistor, a first terminal of the ninth resistor coupled to a second terminal of the eighth resistor, and a second terminal of the ninth resistor being grounded; and
    a third switch element, a control terminal of the third switch element coupled to the second terminal of the eighth resistor, a first terminal of the third switch element coupled to the switch circuit, and a second terminal of the third switch element being grounded.

13. The vehicle of claim 12, wherein the second control circuit comprises:
    a second control chip;
    a tenth resistor, a first terminal of the tenth resistor coupled to the second control chip;
    an eleventh resistor, a first terminal of the eleventh resistor coupled to a second terminal of the tenth resistor, and a second terminal of the eleventh resistor being grounded;
    a third capacitor, a first terminal of the third capacitor coupled to the second terminal of the tenth resistor, and a second terminal of the third capacitor being grounded; and
    a fourth switch element, a control terminal of the fourth switch element coupled to the second terminal of the tenth resistor, a first terminal of the fourth switch element coupled to the switch circuit, and a second terminal of the fourth switch element being grounded.

14. The vehicle of claim 13, wherein the loads of the vehicle comprise a dashboard and a center control panel, the first control chip comprises an integrated cockpit controller (ICC), and the second control chip comprises a microcontroller unit (MCU).

15. A power supply method for controlling a battery pack to supply power to loads of a vehicle, and a switch circuit is coupled between the battery pack and the loads of the vehicle, wherein:
    the switch circuit comprises:

a first resistor, a first terminal of the first resistor coupled to the battery pack;

a first switch element, a first terminal of the first switch element coupled to a second terminal of the first resistor, a control terminal of the first switch element coupled to a first control circuit and a second control circuit;

a second resistor coupled between the first terminal and the control terminal of the first switch element;

a first capacitor coupled to the second resistor in parallel;

a second capacitor, a first terminal of the second capacitor coupled to a second terminal of the first switch element, and a second terminal of the second capacitor being grounded;

a third resistor, a first terminal of the third resistor coupled to the second terminal of the first switch element, and a second terminal of the third resistor being grounded; and a fourth resistor, a first terminal of the fourth resistor coupled to the second terminal of the first switch element, and a second terminal of the fourth resistor coupled to the loads of the vehicle;

the power supply method comprises:

controlling the first control circuit of the vehicle outputting a first control signal to turn on the switch circuit in response to a state of the vehicle being a first state, wherein the battery pack supplies power to the loads of the vehicle in response to the switch circuit being turned on;

detecting whether the first control circuit normally outputs the first control signal in response to the vehicle being in the first state; and enabling the second control circuit of the vehicle outputting a second control signal to control the switch circuit to be turned on in response to the first control circuit does not output the first control signal during the first state.

16. The power supply method of claim 15, further comprising:

controlling the first control circuit to suspend to output the first control signal in response to the vehicle is in a second state, wherein the first state of the vehicle is a non-flameout state or a power-on state, and the second state of the vehicle is a flameout state or a power-off state.

* * * * *